United States Patent [19]

Eck

[11] Patent Number: 5,042,989

[45] Date of Patent: Aug. 27, 1991

[54] PROCESS FOR PRODUCING LUMINESCENT DYESTUFFS FROM PLANT MATERIALS

[75] Inventor: Gerhard Eck, Egelsbach, Fed. Rep. of Germany

[73] Assignee: MASID Gesellschaft fur angewandte Umweltforschung oHG Eck, Runkel und Partner, Dreieich, Fed. Rep. of Germany

[21] Appl. No.: 515,681

[22] Filed: Apr. 26, 1990

Related U.S. Application Data

[63] Continuation of Ser. No. 6,714, filed as PCT EP86/00309 on May 21, 1986, published as WO86/07080 on Dec. 4, 1986, abandoned.

[30] Foreign Application Priority Data

May 29, 1985 [DE] Fed. Rep. of Germany ....... 3519142

[51] Int. Cl.$^5$ .................... C09B 61/00; C09B 67/42
[52] U.S. Cl. .......................... 8/438; 8/524; 8/594; 8/618
[58] Field of Search ............................. 8/438

[56] References Cited

U.S. PATENT DOCUMENTS

| 1,399,014 | 12/1921 | Hart | 8/438 |
|---|---|---|---|
| 4,069,351 | 1/1978 | Yano et al. | 426/650 |
| 4,136,065 | 1/1979 | Yano et al. | 512/5 |
| 4,138,212 | 2/1979 | Stransky | 8/438 |
| 4,156,077 | 5/1979 | Pifferi | 8/438 |
| 4,302,200 | 11/1981 | Yokoyama et al. | 8/438 |
| 4,358,286 | 11/1982 | Grollier et al. | 8/438 |
| 4,383,833 | 5/1983 | Hofmann | 8/438 |
| 4,400,400 | 8/1983 | Langston et al. | 8/438 |
| 4,481,226 | 11/1984 | Crosby et al. | 8/438 |
| 4,500,556 | 2/1985 | Langston | 8/438 |
| 4,666,498 | 5/1987 | Muller | 23/293 R |

FOREIGN PATENT DOCUMENTS 1181079 2/1970 United Kingdom .
2117392 10/1983 United Kingdom .

OTHER PUBLICATIONS

Rosa Jadwiga (Chemical Abstracts, 1974, 81, (No. 3), 12025x).
Article—Chemical Abstracts, vol. 81, Jul. 11, 1974 (p. 222).
Article—Ullmanns Encyklopadie der Technischen Chemie, publisher: Verlag Chemie, Title/Copyright—pp. 99–101.

Primary Examiner—A. Lionel Clingman
Attorney, Agent, or Firm—Burns, Doane, Swecker & Mathis

[57] ABSTRACT

Plant materials such as petals, leaves, fruits, are gathered, dried at a minimum temperature of 70° C., and pulverized so as to produce light-fast, lustrous dyestuffs. Subsequently, an acid or base substance is added. It is preferred that a pH value that corresponds to the pH value of the plant materials when fresh is set. A binding agent can be added subsequently.

22 Claims, No Drawings

PROCESS FOR PRODUCING LUMINESCENT DYESTUFFS FROM PLANT MATERIALS

This application is a continuation of application Ser. No. 07/006,714, filed as PCT EP86/00309 on May 21, 1986, published as WO86/07080 on Dec. 4, 1986, now abandoned.

BACKGROUND OF THE INVENTION

The present invention relates to a process for producing dyestuffs from parts of plants, such parts having been dried.

Many processes of this kind are known. It is common to all such processes that only certain dyestuff plants that are especially suitable can be used for this purpose, such plants being, in particular, dyer's furze, dyer's woad, dyer's esade, indigo, and redwood.

These plants have to be gathered very carefully, in keeping with a strict collection regimen, and only live and healthy specimens or parts thereof may be harvested. After careful drying, that takes place at a maximum temperature of 60° C., the dried plant parts are usually extracted and macerated, the dyestuff then being precipitated and dried. In most cases, the dyestuff has to be ground and mixed after the drying process.

The dyestuffs obtained by using known processes do not, with a few exceptions, such as alizarin and indigo, result in particularly lustrous colours. The dyestuffs so produced are not lasting, and can only be used for waterbased dyes.

The range of applications for dyestuffs produced by the known processes is especially restricted in that the colours are not, or are only slightly, fade-resistant. Because these production methods are very involved and time-consuming, starting with the collection regimen, the dyestuffs that are produced are very costly; the process are scarcely suitable for industrial applications.

The dyestuffs produced from parts of plants by the known processes are of limited use since they are not suitable for use on surfaces that are exposed to weathering, and also because they do not adhere to every base. This latter fact is also caused by the fact that they are not miscible with basic materials, and for this reason cannot be mixed with lime and other roughcast materials.

An object of the present invention is to provide a process of the type described in the introduction hereto, by means of which any, particularly lustrous, colours can be produced simply from parts of plants, without restriction to specific dyestuff plants, said colours being miscible with other colours, fade-resistant, and of extended durability.

DESCRIPTION OF THE PREFERRED EMBODIMENTS OF THE INVENTION

According to the present invention, there is provided a process comprising the following steps:
a) drying the plant materials at a temperature of at least 70° C.;
b) pulverizing the dried parts; and
c) adjusting the pulverized plant parts to a pH value deviating from 7 in an aqueous solution.

The high drying temperatures of at least 70° C. mean that the dyestuffs in the plant materials are made fade-resistant. Although considerably high temperatures of, for example, 360° C. can be used, steps should be taken to ensure that the plant materials do not become brown or otherwise discoloured.

Even though the plant materials have only a dull colouration after being dried, this being attributable to the vegetable stabilizers they contain, lustrous and strong colours are obtained; this is effected by the subsequent step in the process, in which the pulverized plant materials are brought to an acid or base state. It is preferred that the pulverized plant materials be adjusted in an aqueous solution to the pH value at which the plant materials existed in the fresh state. By this means it is possible to retain all the colours that are found in the natural plant domain. It is preferred that a binding agent be added, since this makes it possible to achieve particularly lustrous colour tones. The dried, pulverized plant materials can be combined initially with an acidic or alkaline material in dry form and subsequently, optionally after storage, be mixed with a liquid required for forming the aqueous solution. Preferred embodiments of the invention are subject to further subclaims.

In contrast to known processes, in which only special plants or parts thereof have to be carefully harvested, it is preferred that only dead plants or parts thereof that the plant itself sheds, be gathered for the process according to the present invention; such parts can be petals, leaves, fruits, the peels of fruits, and the like. Thus, for example, the petals of rape (kolza) can be gathered by means of a vacuum apparatus in order to extract a yellow dyestuff once the plant has borne fruit and is fading. This means that the plants can reproduce without being damaged by the harvesting process and without having their growth or reproductive processes impaired.

An elaborate harvesting procedure that is governed by a special harvesting regimen is not necessary. Vacuum machines that break down, compress, squeeze or otherwise damage the material being harvested can be used, even if this causes discolouration. This mean that large quantities of the required substances can be harvested on a rational basis.

Since changes in colouration during harvesting or thereafter are of no consequence, it is not necessary to complete the drying process rapidly, or to undertake any conservation measures if this is not possible.

The plant materials can be dried, preferably at 70°-80° C. or at even higher temperatures, directly in a suitable kiln; however, it is also possible to first dry them naturally and then kiln-dry them in a subsequent stage in the process.

Once dried, the plant materials are pulverized, for example, in mortar-type mills, beater mills, rotary strainer mills, abraders, or the like.

Next, an acid or base substance is added to ensure that the plant materials, which have assumed a dull colouration during the drying process, once more take on a lustrous colouration. It is preferred that the plant materials are once more brought to the pH value at which they were found when harvested.

To this end, citric acid, silicic acid or another organic acid is added to the ground plant materials. It is preferred that a binding agent be added next. The dyestuff so obtained now displays its original, lustrous colouration, which the plants displayed when fresh.

The pH value that is selected can have an important effect on the colour that is obtained from certain plant types. Thus, for example, it is possible to obtain blue dyestuff in that soda powder is added to dried and pulverized elderberries. If citric acid or another organic acid is used instead, a red dyestuff is obtained. The red or blue tones that are obtained are also dependent on the drying temperature or drying times that are used. All the colour tones that are obtained are fade-resistant.

Plant ash can be used as the base material, white plant ash being preferred, and mixed with the pulverized plant materials.

Salts or borax can be added in order to protect the dyestuffs so obtained from pest attack (mold, spotting, insects, etc.).

Basically, any natural or artificial binding agents can be used. It is referred that non-toxic binding agents be used, in order that the dyestuffs that are obtained are also non-toxic.

The dyestuffs so obtained can be processed very simply in that the pulverized dyestuff is mixed with water. What is obtained is a liquid dyestuff that is amenable to application by spraying. Cellulose obtained from pulverized wood or a similar substance can be added as a thickening agent, in order to obtain a somewhat creamier substance that can be applied by brushing. This can then be used as a water colour or, if it has a suitable salt content, as an impregnating agent for woods, or as a glazing or transparent coating.

If sour milk is added, an opaque pigment is obtained, and at the same time the binding agent shifts the pH value into the acid range so that it becomes unnecessary to add other acidic substances. In diluted form, this dye can be used as a glazing or transparent coating. It is suitable for both interior and exterior use. If oil-varnish or another oil is used as a binding agent, an oil paint is obtained.

The dye can be mixed into powdered chalk, for example, molded and then dried in order to obtain coloured chalks or pastel colours. The dyes can also be stirred into liquid wax in order to obtain wax crayons or coloured modelling wax.

In order to obtain dyes for cosmetics, the dyestuff may be mixed into appropriate cremes. If medicinal herbs are used, the therapeutic effects can be retained in the dyestuff providing the appropriate gathering and processing regimens for the medicinal herbs are observed.

The dyestuff can be used for household repairs if added to lime and other roughcast material for, unlike other vegetable dyes, mixing the dyestuffs according to the present invention with the roughcast material does not result in any undesirable colouration.

The dyestuff adheres particularly well to stone or plaster if silica gel or diatomaceous earth is added to it. In contrast to other vegetable dyes, this causes no undesirable colouration.

The use of elder terpenes as the binding agent results in a matt dyestuff that adheres particularly well to any base.

The dyestuffs obtained by the process according to the present invention can be mixed with almost any material or processed with these without any undesirable characteristics, such as toxicity, resulting from this, as is the case with many industrial dyestuffs. With a larger proportion of vegetable stabilizing substances the dyestuffs that are extracted can be used directly in objects such as tiles, insulating panels, and the like. The addition of cellulose or wood powder results in a plastic mass that can be subjected to mechanical processing once it has been dried.

Even though the colour of the dyestuff obtained from vegetable starting material may vary depending on the growth and harvesting conditions, constant colours can be obtained in that various colour tones can be mixed with each other as desired. This colour compensation makes it possible to achieve continuing colour production with constant colour tones.

It is expedient that a few hours after production the colour is monitored by microscopic examination, since all the reactions associated with the process will have been completed by this time.

Dry acids such as hydrochloric acid, citric acid, or dry alkalis such as soda, sodium hydroxide, are commercially available in powder or granular form and can be mixed with the pulverized plant materials so that they can be stored, for example, in the dry state. On the subsequent addition of the liquid required to produce the colour, the dry acids or alkalis will dissolve in this liquid and will simultaneously be diluted to the required proportions so as to render the colour more intensive, stronger or lustrous. This entails the advantage that prepared material that can be used as required for dye production is to hand, and there is no need to measure fresh acid or alkali on each occasion.

The pulverized plant materials can be adjusted to the pH value found in the plants when they are fresh. Overdosing with acid or alkali does no harm. The colour values (brightness, intensity, lustre) remain the same. However, a minimum dose of acid or alkali must be added, this corresponding to the approximate pH value for the fresh state (for acids) or which changes the pH value to the same extent, although towards the base (value).

There are two methods of changing the colour value:

a) Less than the minimum dose is used, when the colour will be less intense and not so lustrous;

b) The drying temperature is increased so as to be at least 70°-80° C.

If drying is completed as a temperature of 80°-90° C., for example, and the pH value is changed, the colour will later become more intense and lustrous. The acid or alkali dose that is added is the same as was formerly the case. An overdose of acid and alkali does not alter the colour value in this case. Less than the minimum dose results in a colour with the lustre and intensity as is the case when drying is completed at 70°-80° C. at the minimum dose.

If drying is carried out at a temperature of approximately 90°-100° C., taking care that the material does not become brown, one later obtains a harsh colouration that fluoresces in darkness, at low light values, in a manner similar to commercial "fluorescent paints." This, too, can be achieved by using less than the minimum dose of acid or alkali. This effect can also be obtained if the dry material is exposed to the above degree of heat for a longer time. The temperature can also be increased (to 360° C., for example), although care must then be taken to ensure that the material does not brown.

The temperature at which drying is carried out is unimportant obtaining a colour that has a minimum luminosity. Using plant materials that have been exposed to elevated temperatures of 70°-80° C. for longer times, this minimum luminosity is obtained by using less than the minimum dose of acid or alkali; increased luminosity is obtained by adding the minimum dose or by exceeding this.

If plant materials are dried at a temperature of approximately 90° C. or more, and maintained at this temperature for an extended period of time, the colour values of these will even out, i.e., the powder that is obtained result in the same colour from one batch to another, so that no differences will be apparent from batch to batch.

I claim:

1. A process for the production of dye from plant materials, which consists essentially of the following steps:
   a) drying the plant materials at a temperature of at least 70° C.;
   b) pulverizing the dried plant materials; and
   c) adjusting the pH of the pulverized plant materials to a non-neutral pH, wherein said pulverized plant materials include the dye.

2. A process of claim 1, wherein the pulverized plant materials are adjusted to approximately the pH value at which they existed in the fresh state.

3. A process of claim 1, including adding a binding agent to the pulverized plant materials.

4. A process of claim 1, wherein the pH is adjusted with the addition of an organic acid.

5. A process of claim 4 wherein the organic acid is citric acid.

6. A process of claim 1, including adding sour milk to the pulverized plant materials.

7. A process of claim 1, wherein the pH is adjusted with the addition of a base.

8. A process of claim 7, wherein the base is sodium carbonate.

9. A process of claim 7, wherein the base is added in the form of plant ash.

10. A process of claim 1, including adding a salt or borax to said pulverized materials for preservation.

11. A process of claim 1, wherein the pulverized, dried plant materials are mixed with an acidic or alkaline substance in dry form, and water is added subsequently.

12. A process of claim 1, wherein the plant materials are dried at a temperature of 70° to 100° C. in step a).

13. A process of claim 1, wherein the plant materials are petals of rape.

14. A process for the production of highly lustrous dye from plant material, comprising the steps of:
   a) providing a quantity of plant material capable of forming a dye and having a known, non-neutral pH when in a fresh state;
   b) drying the plant material at a temperature of at least about 70° C.;
   c) pulverizing the dried plant material;
   d) adding acid or basic reagent to the pulverized plant material in an amount sufficient to provide a pH in aqueous solution which deviates from neutral to at least the same extent as the plant material did when in the fresh state; and
   e) adding water to the pulverized plant material either simultaneously or separately from the addition of the acid or basic reagent, thereby forming an aqueous solution of dye having a pH which deviates from neutral to at least the same extent as the plant material in the fresh state.

15. A process of claim 14, wherein the plant material has an acid pH when in the fresh state, and wherein the pH of the aqueous solution is at or below the pH of the plant material in the fresh state.

16. A process of claim 14, wherein the plant material has an acid pH when in the fresh state, and wherein the aqueous solution is basic and has a pH which is at or above the same amount of deviation from neutral on the basic side that the pH of the plant material in the fresh state is on the acid side of neutral.

17. A process of claim 14, wherein the plant material has a basic pH when in the fresh state, and wherein the pH of the aqueous solution is at or above the pH of the plant material in the fresh state.

18. A process of claim 14, wherein the plant material has a basic pH when in the fresh state, and wherein the aqueous solution is acidic and has a pH which is at or below the same amount of deviation from neutral on the acid side that the plant material in the fresh state was on the basic side of neutral.

19. A process for the production of highly lustrous dye from plant material, comprising the steps of:
   a) collecting a quantity of material consisting of plant material capable of forming a dye and having a known, non-neutral pH when in a living state, said plant material being dead prior to the collecting step;
   b) drying the collected plant material at a temperature of at least about 70° C.;
   c) pulverizing the dried plant material;
   d) adding acid or basic reagent to the dried, pulverized plant material in an amount sufficient to provide a pH in aqueous solution which deviates from neutral to at least the same extent as the plant material did when in the living state; and
   e) adding water to the pulverized plant material either simultaneously or separately from the addition of the acid or basic reagent, thereby forming an aqueous solution of dye having a pH which deviates from neutral to at least the same extent as the plant material in the living state.

20. A process according to claim 19, wherein said dead plant material consists of material shed or discarded by a living plant.

21. A process according to claim 20, wherein said collecting step includes gathering said dead plant material by vacuum apparatus means.

22. A process according to claim 21, wherein said vacuum apparatus means causes discoloration of said dead plant material.

* * * * *